(12) United States Patent
Matsushima (10) Patent No.: US 7,705,933 B2
(45) Date of Patent: Apr. 27, 2010

(54) LIQUID CRYSTAL DISPLAY APPARATUS AND ELECTRONIC APPARATUS

(75) Inventor: Toshiharu Matsushima, Suwa (JP)

(73) Assignee: Seiko Epson Corporation (JP)

( * ) Notice: Subject to any disclaimer, the term of this patent is extended or adjusted under 35 U.S.C. 154(b) by 1150 days.

(21) Appl. No.: 11/325,650

(22) Filed: Jan. 4, 2006

(65) Prior Publication Data
US 2006/0158590 A1 Jul. 20, 2006

(30) Foreign Application Priority Data
Jan. 19, 2005 (JP) ............................ 2005-011177

(51) Int. Cl.
G02F 1/1347 (2006.01)
G02F 1/1335 (2006.01)

(52) U.S. Cl. ............................ 349/75; 349/74; 349/96

(58) Field of Classification Search ............ 349/74, 349/75
See application file for complete search history.

(56) References Cited

U.S. PATENT DOCUMENTS 5,680,184 A * 10/1997 Nishino .................... 349/78

7,495,719 B2 * 2/2009 Adachi et al. ............... 349/96

FOREIGN PATENT DOCUMENTS

| JP | 10-197844 | 7/1998 |
|---|---|---|
| JP | 11-174489 | 7/1999 |
| JP | 11-295749 | 10/1999 |
| JP | 11-326910 | 11/1999 |
| JP | 2000-338489 | 12/2000 |
| JP | 2002-297044 | 10/2002 |
| JP | 2003-270626 | 9/2003 |
| JP | 2005-062901 | 3/2005 |
| KR | 10-0228811 | 8/1999 |

OTHER PUBLICATIONS

Machine translation of JP 11-174489A.*
Communication from Korean Patent Office regarding counterpart application.

* cited by examiner

Primary Examiner—David Nelms
Assistant Examiner—W. Patty Chen
(74) Attorney, Agent, or Firm—Harness, Dickey & Pierce, P.L.C.

(57) ABSTRACT

A liquid crystal display apparatus includes a viewing-angle controlling liquid crystal layer that, when in a horizontal alignment state, exhibits a slow axis that is parallel to a polarized-light transmitting or absorbing axis of a polarizing layer that is disposed opposite to the displaying liquid crystal layer from the viewing-angle controlling liquid crystal layer.

13 Claims, 10 Drawing Sheets

EQUAL CONTRAST RATIO CONTOUR

FIG. 6
EQUAL CONTRAST RATIO CONTOUR

FIG. 7
EQUAL CONTRAST RATIO CONTOUR

FIG. 11
ISOLUMINANCE CONTOUR

FIG. 12
ISOLUMINANCE CONTOUR

FIG. 13
ISOLUMINANCE CONTOUR

FIG. 14
ISOLUMINANCE CONTOUR

FIG. 17
ISOLUMINANCE CONTOUR

LIQUID CRYSTAL DISPLAY APPARATUS AND ELECTRONIC APPARATUS

BACKGROUND

1. Technical Field

The present invention relates a liquid crystal display apparatus and an electronic apparatus, and more particularly, to a construction of a liquid crystal display apparatus suitable for a display apparatus capable of limiting a viewing angle range of a display screen.

2. Related Art

In general, there is a case where an owner of a mobile phone or other portable information terminals with a liquid crystal display apparatus built in intends to see a display screen of the liquid crystal display apparatus while preventing other persons from seeing the display screen. In this case, conventionally, a narrow viewing angle display device has been used, or an optical film for limiting the viewing angle has been attached on the display screen. However, in a case where many persons intend to be allowed to see the display screen, since the viewing angel cannot be widened, the conventional methods are inconvenient.

Therefore, an apparatus having a liquid crystal display apparatus provided with a viewing angel controlling device for controlling the viewing angle and capable of changing the viewing angles between wide and narrow states by switching the viewing angle controlling device is disclosed (for example, see JP-A-2002-297044). For example, a technique for using a chiral nematic liquid crystal, a homogeneous liquid crystal, a randomly aligned nematic liquid crystal, or the like as a liquid crystal mode of a phase difference controlling liquid crystal device is disclosed in JP-A-11-174489.

However, in the liquid crystal display apparatus using the aforementioned phase difference controlling liquid crystal device, although a range where a contrast ratio becomes 10:1 is slightly narrow due to the switching of the phase difference controlling liquid crystal device, there are problems in that a boundary value of a polar angle in the associated range is about 50% to 70% of the before-switching one, a whole change in the contrast is small, and it is difficult to sufficiently control viewing angle. In particular, since sufficient viewing can be generally obtained with a contrast ratio of about 2:1, the aforementioned technique is not a practical display technique for preventing persons existing at left and right side from viewing the display screen by limiting the viewing angle.

SUMMARY

An advantage of the invention is that it provides a liquid crystal display apparatus including a viewing angle controlling member capable of ensuring a wide viewing angle controlling range or changing states in comparison to a conventional technique.

According to an aspect of the present invention, there is provided a liquid crystal display apparatus having a displaying liquid crystal layer, a displaying electric field applying structure for applying a displaying electric field to the displaying liquid crystal layer, and a pair of polarizing layers sandwiching the displaying liquid crystal layer therebetween, the liquid crystal display apparatus comprising: a viewing-angle controlling liquid crystal layer disposed between one of the polarizing layers and the displaying liquid crystal layer; and a viewing-angle controlling electric field applying structure for applying a viewing-angle controlling electric field to the viewing-angle controlling liquid crystal layer, wherein the viewing-angle controlling liquid crystal layer is constructed to change between horizontal and vertical alignment states, and wherein a slow axis in the horizontal alignment state of the viewing-angle controlling liquid crystal layer is disposed in parallel to a polarized-light transmitting or absorbing axis of the polarizing layer disposed opposite to the displaying liquid crystal layer with respect to the viewing-angle controlling liquid crystal layer.

According to the present invention, since the viewing-angle controlling liquid crystal layer is constructed to change between substantially uniform horizontal and vertical alignment states, and since the slow axis in the horizontal alignment state is disposed to substantially parallel to the polarized-light transmitting or absorbing axis of a polarizing layer (an adjacent polarizing layer) disposed at the opposite to the display liquid crystal layer, an influence of the viewing-angle controlling liquid crystal layer in the horizontal alignment state on the distribution of the polar angle of transmittance can be semantically removed, so that the viewing angle cannot be limited by maintaining the viewing-angle controlling liquid crystal layer in the horizontal alignment state. On the other hand, since the polarization state of the light incident in a slanted direction changes in the vertical alignment state, a use efficiency of light decreases or light leakage increase in a portion where the polar angle is high, so that the contrast ratio can be greatly reduced in comparison to the conventional technique. As a result, the viewing angle limitation effect can be improved.

In the aforementioned aspect of the present invention, the viewing-angle controlling liquid crystal layer may in a horizontal alignment state when no electric field is applied by the viewing-angle controlling electric field applying structure, and the viewing-angle controlling liquid crystal layer may be in a vertical alignment state when an electric field is applied. In this case, since the horizontal alignment state is initially aligned, the slow axis in the horizontal alignment state can be easily defined to be the polarized-light transmitting or absorbing axis of the polarizing layer, and the directions of the axes can be easily and accurately defined.

In addition, the viewing-angle controlling liquid crystal layer may be in a vertical alignment state when no electric field is applied by the viewing-angle controlling electric field applying structure, and the viewing-angle controlling liquid crystal layer may be in a horizontal alignment state when an electric field is applied. By doing so, since the vertical alignment state of the viewing-angle controlling liquid crystal layer can be easily defined, an optical state in case of limiting the viewing angle can be easily and accurately defined.

In addition, an alignment azimuth angle in the horizontal alignment state of the viewing-angle controlling liquid crystal layer may be defined as four directions which are substantially parallel to the polarized-light transmitting and absorbing axes. By doing so, since the slow axis of the viewing-angle controlling liquid crystal layer in the horizontal alignment state is defined to be four directions parallel to any one of the polarized-light transmitting and absorbing axes, the aforementioned basic conditions of the present invention are satisfied, and the liquid crystal molecules are directed at a plurality of the alignment azimuth angles, so that azimuth angel dependency of optical characteristics can be surely reduced when the viewing-angle controlling liquid crystal layer is in the horizontal alignment state. In this case, the four directions of the viewing-angle controlling liquid crystal layer in the horizontal alignment state can be defined by using alignment limiting members such as protrusions, slits (electrode openings), and ribs for limiting an inverse alignment directions of the liquid crystal molecules.

In addition, phase difference layers may be disposed to be adjacent to both sides of the displaying liquid crystal layer. By doing so, a circularly polarized light can be incident to the displaying liquid crystal layer by disposing the phase difference layers at both sides of the displaying liquid crystal layer, the alignment directions of the displaying liquid crystal layer and the viewing-angle controlling liquid crystal layer can be accurately aligned, so that the apparatus can be easily manufactured.

In addition, the slow axis of the viewing-angle controlling liquid crystal layer may be defined to be slanted when a display screen is seen from a front surface thereof. In the present invention, since the viewing angle in directions parallel to or perpendicular to the slow axis, that is, directions of the polarized-light transmitting and absorbing axes can be widened, the viewing angle limitation effect in the left/right direction can be improved by defining the slow axis in a slanted direction, so that it is possible to surely prevent other persons from viewing the display screen in the left/right direction.

According to another aspect of the present invention, there is provided an electronic apparatus which any one of the aforementioned liquid crystal display apparatuses is built in. In particular, the viewing angle limitation effect of the present invention can be effectively used for portable information terminals such.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1A:
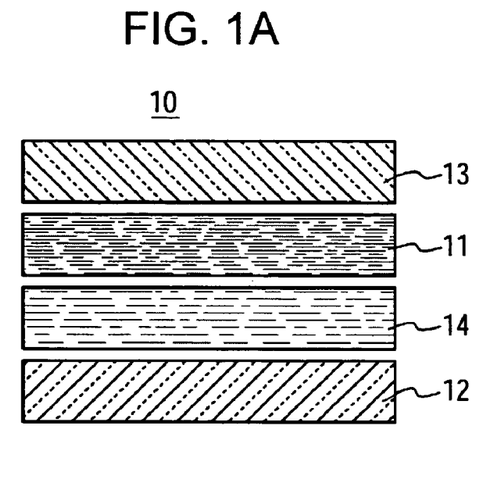
FIGS. 1A and 1B show schematic constructional views of a basic construction of a first embodiment of the present invention.

Now, a first embodiment of the present invention will be described in detail with reference to the accompanying drawings. FIG. 1 is a schematic constructional view showing a basic construction of a liquid crystal display apparatus according to the embodiment. In the basic construction 10 shown in FIG. 1A, a pair of polarizing layer 12 an 13 sandwich a displaying liquid crystal layer 11 therebetween, and a viewing-angle controlling liquid crystal layer 14 is disposed between the polarizing layer 12 of an incident light side (that is, a lower one shown in the figure) and the displaying liquid crystal layer 11. In the construction 10, a light incident from a light source such as a backlight becomes a linearly polarized light having a vibrating plane parallel to the polarized-light transmitting axis of the polarizing layer 12, and after that, optically modulated by the viewing-angle controlling liquid crystal layer 14. Subsequently, the light is subject to optical modulation for forming a predetermined display in the displaying liquid crystal layer 11, so that only the polarized light component having a vibrating plane parallel to the polarized-light transmitting axis of the polarizing layer 13 emits toward an observer's side.

Figure 1B:
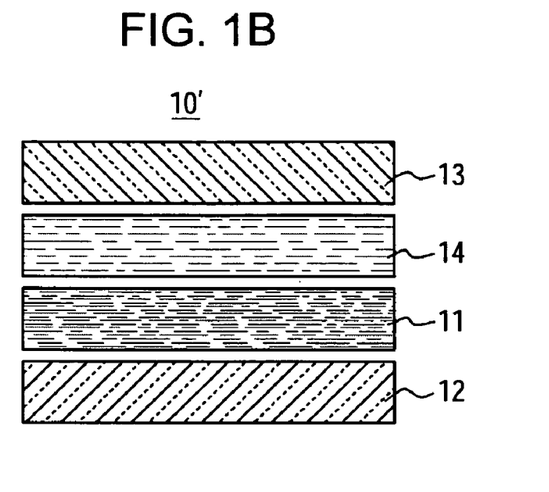

On the other hand, although the basic construction 10' shown in FIG. 1B is equal to the aforementioned construction in that a pair of polarizing layer 12 and 13 sandwich the displaying liquid crystal layer 11 therebetween, the construction 10' is different from the aforementioned construction in that the viewing-angle controlling liquid crystal layer 14 is disposed between the polarizing layer 13 of the light-emitting side (that is, the observer's side, an upper one shown in the figure) and the displaying liquid crystal layer 11. In the construction 10', the light incident from a light source becomes a linearly polarized light having a vibrating plane parallel to the polarized-light transmitting axis of the polarizing layer 12, and after that, subject to optical modulation for forming a predetermined display in the displaying liquid crystal layer 11. Subsequently, the light is also optically modulated by the viewing-angle controlling liquid crystal layer 14, so that only the polarized light component having a vibrating plane parallel to the polarized-light transmitting axis of the polarizing layer 13 emits toward an observer's side.

In both of the constructions 10 and 10' shown in FIGS. 1A and 1B, since a distribution of a viewing angle of the transmitting light is modulated in the viewing-angle controlling liquid crystal layer 14, a distribution of a viewing angle of a display image generated from the optical modulation in the displaying liquid crystal layer 11 is also modulated. Although the liquid crystal display apparatus according to the embodiment may employ a structure corresponding to any one of the aforementioned constructions (that is, although the incident light side or the observer's side may be defined as any one of lower and upper ones), the following description is made in an assumption that the liquid crystal display apparatus employ the construction 10 shown in FIG. 1A.

Figure 2:
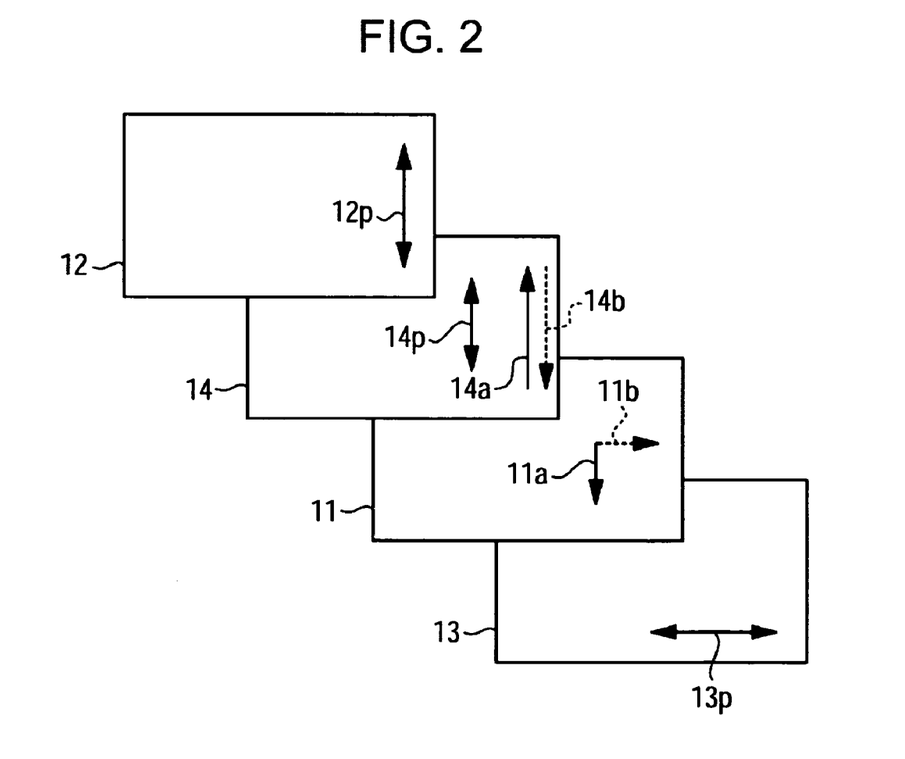
FIG. 2 is a view for explaining a relation between a polarization axis of a polarizing layer and a slow axis of a liquid crystal layer according to the first embodiment.

FIG. 2 is a schematic view showing a relative positional relation of the polarizing layer 12, the viewing-angle controlling liquid crystal layer 14, the displaying liquid crystal layer 11, and the polarizing layer 13 in the basic construction 10 according to the embodiment. In the embodiment, a modulated light axis 12$p$ (that is, the polarized-light transmitting axis or the polarized-light absorbing axis) of the polarizing layer 12 is constructed to be substantially parallel to a slow axis 14$p$ of the viewing-angle controlling liquid crystal layer 14 adjacent thereto.

Here, the slow axis 14$p$ denotes a slow axis (an axis coincident with a direction of a lowest-refraction-index axis of a liquid crystal layer having an anisotropic refraction index) in a case where the viewing-angle controlling liquid crystal layer 14 is in the horizontal alignment state. Due to a later-described electrode structure (a viewing-angle controlling electric field applying structure), the viewing-angle controlling liquid crystal layer 14 according to the embodiment is constructed to change between a substantially uniform horizontal alignment state and a substantially uniform vertical alignment state, so that liquid crystal molecules in the horizontal alignment state are basically aligned to be parallel to the polarization axis 12$p$ of the polarizing layer 12. In the example shown in the figure, an azimuth angle parallel to the slow axis 14$p$ is defined as the alignment directions 14$a$ and 14$b$ of a later-described alignment layer. However, since the polarized-light transmitting and absorbing axes of the polarizing layer 12 are perpendicular to each other, the slow axis 14$p$ and the polarization axis 12$p$ may be constructed to be perpendicular to each other. Here, the alignment direction 14$a$ denotes alignment directions of the liquid crystal molecules at the side of the polarizing layer 12, and the alignment direction 14$b$ denotes alignment directions of the liquid crystal molecules at the side of the displaying liquid crystal layer 11.

In addition, the construction that the polarization axis 12$p$ of the polarizing layer 12 is substantially parallel to the slow axis 14$p$ of the viewing-angle controlling liquid crystal layer 14 adjacent thereto denotes a construction that the axes may not entirely parallel to each other or a construction that the axes are in a range of $-10°$ to $+10°$ with respect to an azimuth angle corresponding an entirely parallel case. If the axes are in the range, optical characteristics are substantially equal to those of the entirely parallel case. However, a range of $-5°$ to $+5°$ is preferable in terms of the optical characteristics.

In the embodiment, as described above, a TN (twisted nematic) mode displaying liquid crystal layer 11 is provided, and the polarizing layers 12 and 13 are disposed in a perpendicular nicole arrangement. As a result, if the viewing-angle controlling liquid crystal layer 14 is not provided, the embodiment is constructed as a general normally white mode TN-type liquid crystal display apparatus. Therefore, in the displaying liquid crystal layer 11, an incident-light-side alignment direction 11$a$ is defined to be parallel to the polarized-light transmitting axis 12$p$ of the polarizing layer 12, and a light-emitting-side alignment direction 11$b$ is defined to be parallel to the polarized-light transmitting axis 13$p$ of the polarizing layer 13.

Figure 3:
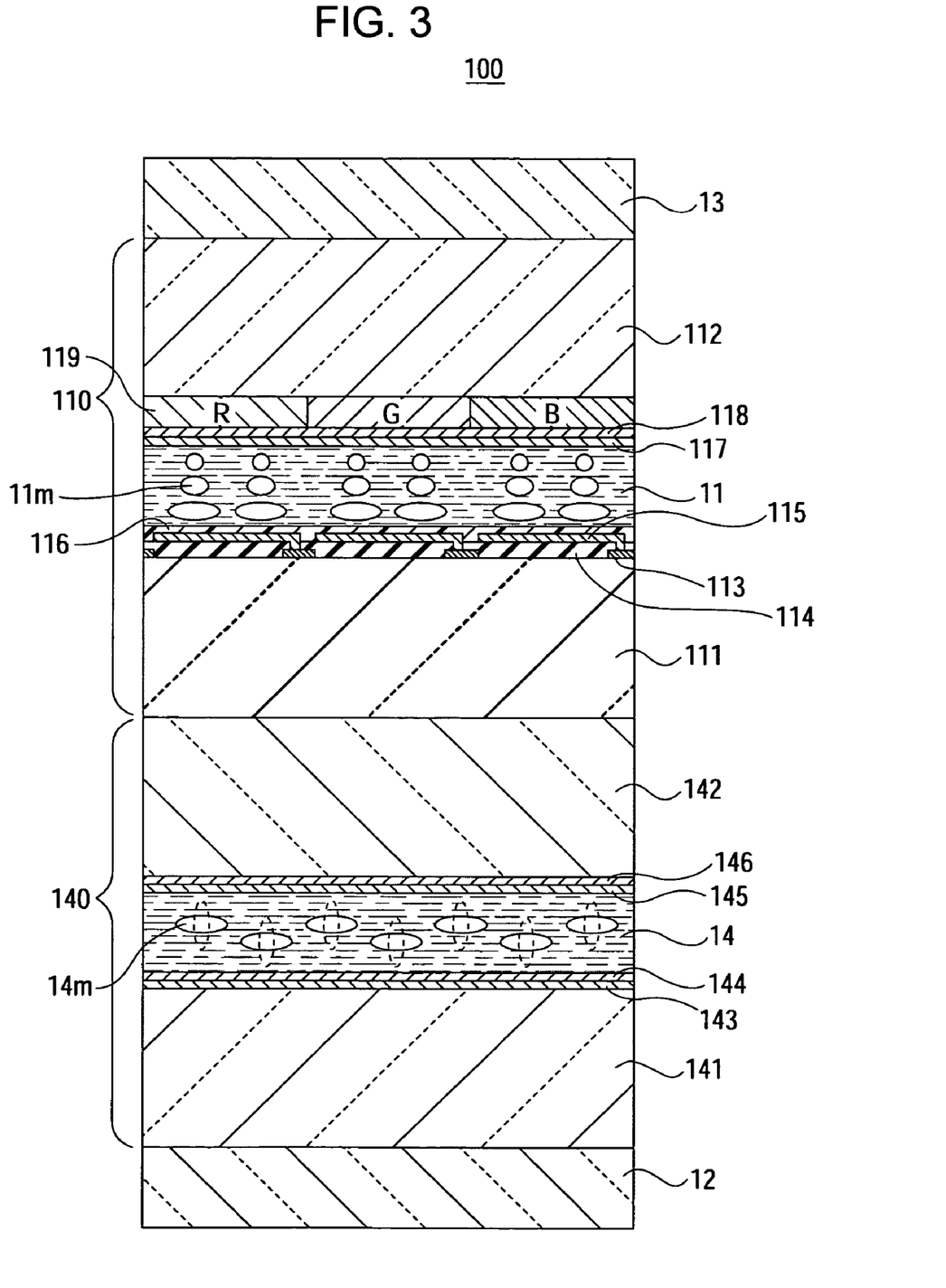
FIG. 3 is a partially enlarged longitudinal cross sectional view showing an enlarged cross sectional structure of the first embodiment.

FIG. 3 is a partially enlarged longitudinal cross sectional view showing an enlarged actual structure of the embodiment. The liquid crystal display apparatus according to the embodiment includes a displaying liquid crystal cell 110 constructed by interposing a displaying liquid crystal layer 11 between transparent substrates 111 and 112 made of a glass, a plastic, or the like, a polarizing layer 12 disposed at an incident-light side of the displaying liquid crystal cell 110, a polarizing layer 13 disposed at an light-emitting side of the displaying liquid crystal cell 110, and a viewing-angle controlling liquid crystal cell 140 disposed between the displaying liquid crystal cell 110 and the polarizing layer 12 and constructed by interposing a viewing-angle controlling liquid crystal layer 14 between transparent substrates 141 and 142.

Switching devices 113 such as TFD devices, an interlayer insulating film 114, pixel electrodes 115 (displaying electric field applying structure) disposed on the interlayer insulating film 114, and an alignment film 116 disposed on the pixel electrodes 115 are formed on an inner surface of the substrate 111 of the displaying liquid crystal cell 110. Here, the switching devices 113 are electrically connected to wire lines (not shown), and the pixel electrodes 115 are connected to the switching devices 113 via through-holes formed in the interlayer insulating film 114. The pixel electrodes 115 are made of a transparent conductive material such as ITO (indium tin oxide). The alignment film 116 is made of an organic resin such as polyimide or an inorganic insulating material such as $SiO_2$.

On the other hand, a color filter 119 constructed by arraying colored layers (three colored layers of R (red), G (green), and B (blue) in the example shown in the figure) representing predetermined colors in predetermined pattern corresponding to a pixel array is formed on an inner surface of the substrate 112 of the displaying liquid crystal cell 110. Preferably, a transparent protective layer (not shown), that is a planarization layer made of an acryl resin to protect the colored layers and ensure a polarization property of a surface thereof is also formed on the colored layers of the color filter 119. Counter electrodes 118 (displaying electric field applying structures) made of a transparent conductive material such as ITO is formed on the color filter 119. In a case where two-port nonlinear devices such as TED device described above are used as the switching devices 113, each of the counter electrodes 118 (displaying electric field applying structures) is formed in a shape of a band having a width corresponding to that of a pixel, and a plurality of the counter electrodes 118 are arrayed in stripe. However, in a case where three-ports nonlinear devices which as TFTs (thin film transistors) are used as the switching devices 113, the counter electrodes are formed to be integrated into the entire surface of the array region of the pixels. In addition, an alignment film 117 is formed on the counter electrodes 118. The alignment film 117 is constructed to be similar to the alignment film 116.

In the example shown in the figure, the displaying liquid crystal layer 11 is constructed with nematic liquid crystal having a light circulating property and a twisted angle of 90°. Namely, when the electric field is not applied, the liquid crystal molecules 11m on the inner surface of the substrate 111 are aligned in a manner where long axes thereof are directed in the alignment direction of the alignment film 116, the liquid crystal molecules 11m on the inner surface of the substrate 112 are aligned in a manner where long axes thereof are directed in the alignment direction of the alignment film 117, and the liquid crystal molecules 11m therebetween are aligned to be gradually twisted in a thickness direction of the layer. In addition, in the displaying liquid crystal cell 110, regions corresponding to plane ranges of the pixel electrodes 115 (displaying electric field applying structure) in the displaying liquid crystal layer 11 constitute pixels.

An electrode layer 143 (a viewing-angle controlling electric field applying structure) made of a transparent conductive material such as ITO and an alignment film 144 formed on the electrode layer 143 are disposed on an inner surface of the substrate 141 of the viewing-angle controlling liquid crystal layer 14. The electrode layer 143 is formed to be integrated into the entire plane region overlapping the pixel array region of the displaying liquid crystal layer 11. In addition, although the alignment film 144 may be made of an organic resin such as a polyimide resin or an inorganic insulating material such as $SiO_2$ similarly to the aforementioned alignment film, in the example shown in the figure, the liquid crystal molecules 14m in the viewing-angle controlling liquid crystal layer 14 are constructed to have an initial alignment function for aligning in the horizontal direction when the electric field is not applied. For example, the alignment film 144 may be formed by coating and sintering a horizontal alignment polyimide film and performing a rubbing process in the alignment direction 14a.

An electrode layer 146 made of a transparent conductive material such as ITO and an alignment film 145 formed on the electrode layer 146 (a viewing-angle controlling electric field applying structure) are disposed on an inner surface of the substrate 142 of the viewing-angle controlling liquid crystal layer 14. The electrode layer 146 is formed to be integrated into the entire plane region overlapping the pixel array region of the displaying liquid crystal layer 11. In addition, although the alignment film 145 may be made of an organic resin such as a polyimide resin or an inorganic insulating material such as $SiO_2$ similarly to the aforementioned alignment film, in the example shown in the figure, the liquid crystal molecules 14m in the viewing-angle controlling liquid crystal layer 14 are constructed to have an initial alignment function for aligning in the horizontal direction when the electric field is not applied. For example, the alignment film 145 may be formed by coating and sintering a horizontal alignment polyimide film and performing a rubbing process in the alignment direction 14b.

In the viewing-angle controlling liquid crystal cell 140, when the electric field is not applied, the viewing-angle controlling liquid crystal layer 14 is in the initial alignment state, that is, a substantially uniform horizontal alignment state, and long axes of all the liquid crystal molecules 14m are directed in the rubbing direction. The liquid crystal molecules 14m are constructed with nematic liquid crystals having a positive anisotropic dielectric constant. Here, if a predetermined voltage exceeding a threshold value is applied between the electrode layers 143 and 144, the long axes of the liquid crystal molecules 14m are directed in a direction of the electric field, and the viewing-angle controlling liquid crystal layer 14 are in a substantially uniform vertical alignment state.

In the embodiment, in a case where light is incident from a lower portion of FIG. 3 (a case where such a backlight is disposed under the polarizing layer 12 of FIG. 3), if the light passes through the polarizing layer 12, the light becomes a linearly polarized light having a vibrating plane parallel to the polarized-light transmitting axis and after that, incident to the viewing-angle controlling liquid crystal layer 14. When the viewing-angle controlling liquid crystal layer 14 is in the horizontal alignment state, since the azimuth angle of the polarization axis 12p of the incident linearly polarized light is substantially equal to the azimuth angle of the slow axis of the viewing-angle controlling liquid crystal layer 14, the refraction index for the incident light influence with only one of the refraction indexes in the long and short axis directions of the molecules, so that optical modulation (change in a polarization state) of the linearly polarized light cannot occur, and the incident angle of the linearly polarized light on the optical modulated state can be substantially removed. In particular, since the polarization axis 12p of the polarizing layer 12 and the slow axis of the viewing-angle controlling liquid crystal layer 14 are constructed to be parallel to each other, influence of the displaying liquid crystal cell 110 on the viewing angle characteristics of the display image cannot occur.

On the other hand, if the viewing-angle controlling liquid crystal layer 14 is in the vertical alignment sate, since the liquid crystal molecules 14m has a vertical behavior, the light incident from a normal direction of the substrate dose not have a birefringence property, but influence on the incident angle occurs. Namely, although no optical influence on the linearly polarized light parallel to the long axis of the liquid crystal molecules 14m occurs, the influence (that is, a degree of influence caused by the refraction indexes in the different long and short axis directions) of the anisotropic refraction index of the liquid crystal molecules 14m on the linearly polarized light incident in a slanted direction about the long axes of the molecules changes according to the incident angle. In general, as the incident angle increases, the degree of change in the polarization state of the linearly polarized light. As a result, a use efficiency or a shield efficiency of light decreases, so that the intensity of light emitting from the polarizing layer 13 is reduced, or light leakage occurs. Therefore, a contrast of an image in a high viewing angle direction generated by displaying liquid crystal cell 110 decreases.

Figure 4:
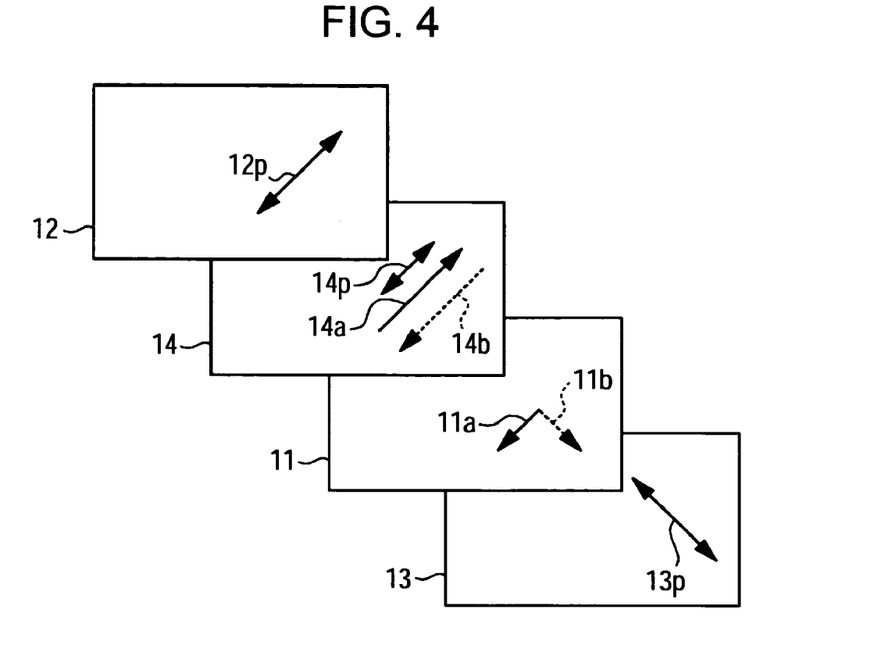
FIG. 4 is a view for explaining a relation between a polarization axis and a slow axis in another example of a construction according to the first embodiment.

FIG. 4 shows a state where the azimuth angles of the polarizing layers 12 and 13 and the viewing-angle controlling liquid crystal layer 14 according to the embodiment change. In the example, a display screen of the embodiment is constructed to have a behavior shown in FIG. 4, and the polarization axis 12p and 13p (polarized-light transmitting or polarized-light absorbing axis; the polarized-light transmitting axis in the example shown in the figure) of the polarizing layer 12 and 13 are constructed to be slanted about an up/down direction (a up/down direction shown in the figure) when the display screen is seen from the front side thereof. In the example shown in the figure, it is preferable that the polarization axes 12p and 13p are defined to be slanted with a slope of 45° about the up/down direction. By doing so, a viewing angle limitation effect caused by the viewing-angle controlling liquid crystal layer 14 using can increase in the up/down and left/right directions, so that the viewing angle limitation effect can further increase in a situation that the display screen is likely to be seen from the left/right direction.

In this case, preferably, the slanted angle of the slow axis is optically defined to be in a range of 10° to 45° with respect to a polarization axis.

Figure 5:
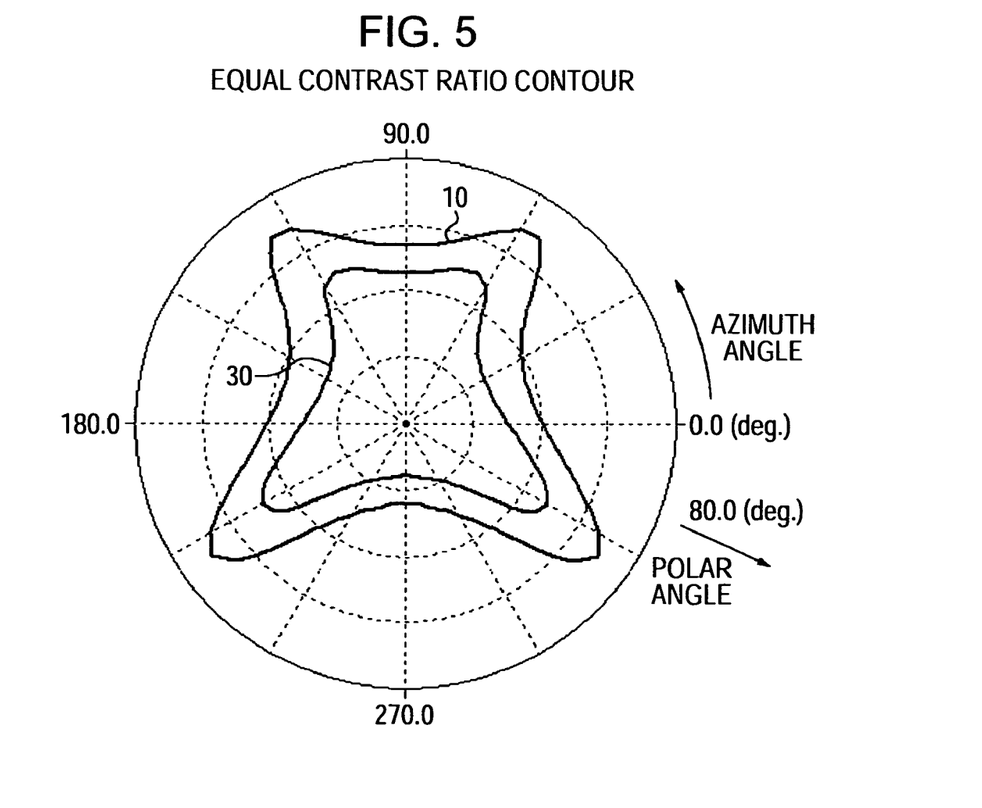
FIG. 5 is a distributional view showing distributions of azimuth and polar angles of a contrast characteristic of a structure where a viewing-angle controlling liquid crystal cell is excluded from the first embodiment.
Figure 6:
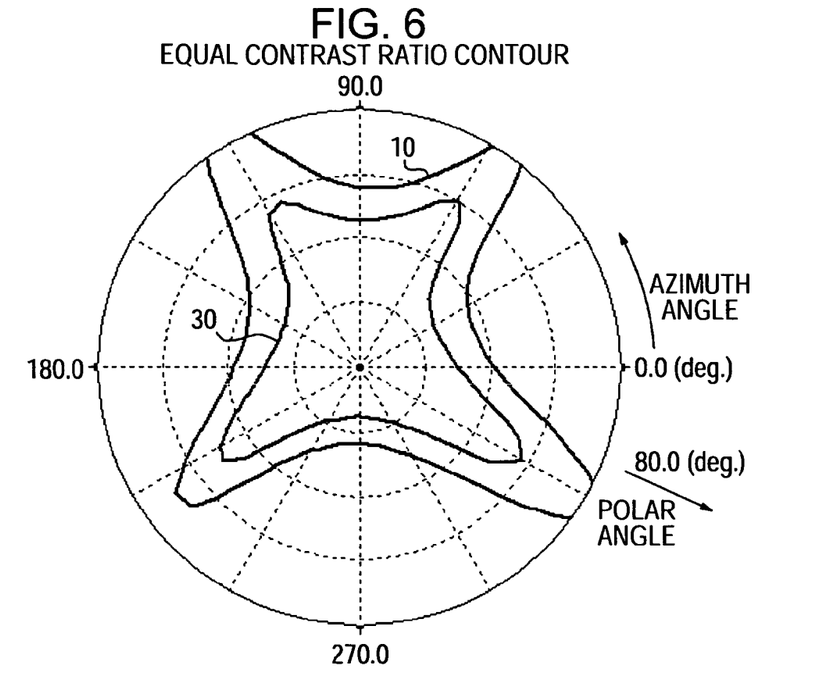
FIG. 6 is a distributional view showing distributions of azimuth and polar angles of a contrast characteristic in a case where a viewing-angle controlling liquid crystal layer is in a horizontal alignment state in the first embodiment.
Figure 7:
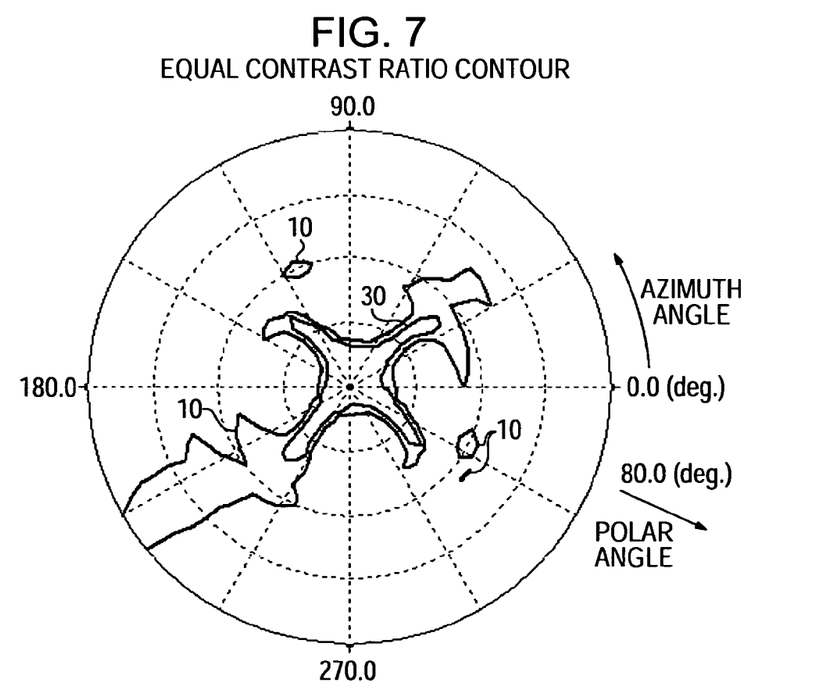
FIG. 7 is a distributional view showing distributions of azimuth and polar angles of a contrast characteristic in a case where a viewing-angle controlling liquid crystal layer is in a vertical alignment state in the first embodiment.

FIG. 5 shows distributions of azimuth and polar angles of a contrast characteristic of a structure where the viewing-angle controlling liquid crystal layer 14 shown in FIG. 3 is removed from the construction shown in FIG. 4, FIG. 6 shows distribution of azimuth and polar angles of a contrast characteristic according to the embodiment when an electric field is not applied to the viewing-angle controlling liquid crystal layer 14, and FIG. 7 shows distribution of azimuth and polar angles of a contrast characteristic according to the embodiment when a voltage (30V) exceeding a threshold voltage is applied to the viewing-angle controlling liquid crystal layer 14. Here, retardation $\Delta n \cdot d$ ($\Delta n$ is an anisotropic refraction index of a liquid crystal and d is a cell gap [μm]) of the viewing-angle controlling liquid crystal layer 14 is defined to be 4.0 μm. In the figures, curves denoted by reference numeral 30 is an equal contrast ratio contour having a contrast of 30, and curves denoted by reference numeral 10 is an equal contrast ratio contour having a contrast of 10.

Referring to the figures, when the electric field is not applied to the viewing-angle controlling liquid crystal layer 14, the embodiment ahs a wide viewing angle substantially equal to that of the structure where the viewing-angle controlling liquid crystal layer 14 is removed. On the contrary, when the electric field is applied to the viewing-angle controlling liquid crystal layer 14, a region having a contrast ratio of 10 or less is greatly enlarged, and although the viewing angle limitation effect to the azimuth angle region in the polarized-light transmitting and absorbing axes of the polarizing layers 12 and 13 is relatively weak, a very narrow viewing angle is obtained in a direction deviated from the associated azimuth angle, so that the contrast ratio becomes 10 or less if the polar angle exceeding a range of 10° to 15°. Therefore, it can be understood that the embodiment can improve the viewing angle limitation effect in comparison to the conventional technique, and any practical problem cannot occur.

In addition, in the embodiment, since the constructions 10 and 10' are sufficient, for example, the substrate 111 of the displaying liquid crystal cell 110 and the substrate 142 of the viewing-angle controlling liquid crystal cell 140 shown in FIG. 3 may be constructed as a common substrate.

In addition, in the embodiment, a viewing angle compensation plate may be disposed at a position adjacent to the display liquid crystal layer. In this case, the viewing-angle controlling liquid crystal cell is needed to be directly adjacent to a one-side polarization plate without interposing the viewing angle compensation plate.

Second Embodiment

Now, a liquid crystal display apparatus 200 according to a second embodiment of the present invention will be described with reference to FIG. 8. The embodiment is different from the first embodiment in that the displaying liquid crystal cell 210 is in a vertical aligned mode, an initial alignment state of a viewing-angle controlling liquid crystal cell 240 is a vertical alignment state, the alignment state thereof becomes a horizontal alignment state when an electric field is applied thereto, and phase difference layers 21A and 21B are disposed at both sides of the displaying liquid crystal cell 210. However, the viewing-angle controlling liquid crystal cell 240 may has the same structure as the viewing-angle controlling liquid crystal cell 140 of the first embodiment.

In the displaying liquid crystal cell 210 of the embodiment, retardation $\Delta n \cdot d$ of a displaying liquid crystal layer 21 is defined to be 0.42 μm by using a liquid crystal (a nematic liquid crystal) having a negative anisotropic dielectric constant. In addition, substrates 211 and 212, switching devices 213, an interlayer insulating film 214, pixel electrodes 215 (a displaying electric field applying structure), a color filter 219, counter electrodes 218, and the like are basically the same as those of the first embodiment, and thus, detailed description thereto is omitted. On the other hand, alignment films 216 and 217 are constructed with a vertical alignment film made of a vertical alignment polyimide film, or the like. Here, in the displaying liquid crystal layer 21 of the vertically aligned mode, in order to define an inverse alignment direction from an initial alignment state when an electric field is applied, the long axes of the liquid crystal molecules 21m are slightly slanted from a vertical direction in the inverse alignment direction. Here, the inverse alignment direction may be defined by performing a rubbing process on the vertical alignment film or by providing protrusions 217t or concave portions to a surface of the alignment film or providing alignment defining members such as openings (slits) to the counter electrodes 218 (displaying electric field applying structure). In particular, in order to surely reducing azimuth angle dependency of display performance, it is preferable that the liquid crystal molecules 21m are constructed to be inverted in a radial direction about the alignment controlling members such as the protrusions 217t.

In addition, unlike the first embodiment, in the viewing-angle controlling liquid crystal cell 240, in order to obtain a vertically alignment initial alignment state, the alignment films 244 and 245 employ a vertical alignment film such as a vertical alignment polyimide film. In this case, in electrode layers 246 and 243 (viewing-angle controlling electric field applying structure), in order to define an inverse azimuth angle of liquid crystal molecules 24m when the electric field is applied, a uniform horizontal alignment state is obtained over the entire area of the viewing-angle controlling liquid crystal layer 24 by performing a rubbing process or the like on the vertical alignment film. Similarly to the first embodiment, when the voltage is applied, the inverse alignment direction of the liquid crystal molecules 24m in the horizontal alignment state is defined to be substantially equal to the polarized-light transmitting or absorbing axis of the polarizing layer 22.

Figure 9:
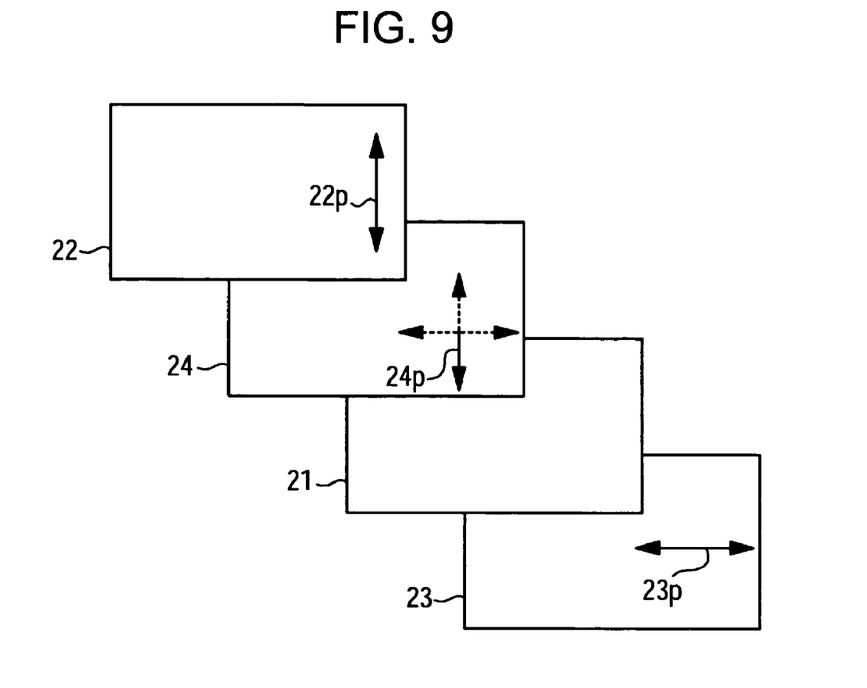
FIG. 9 is a view for explaining a relation between a polarization axis and a slow axis according to the second embodiment.
Figure 10:
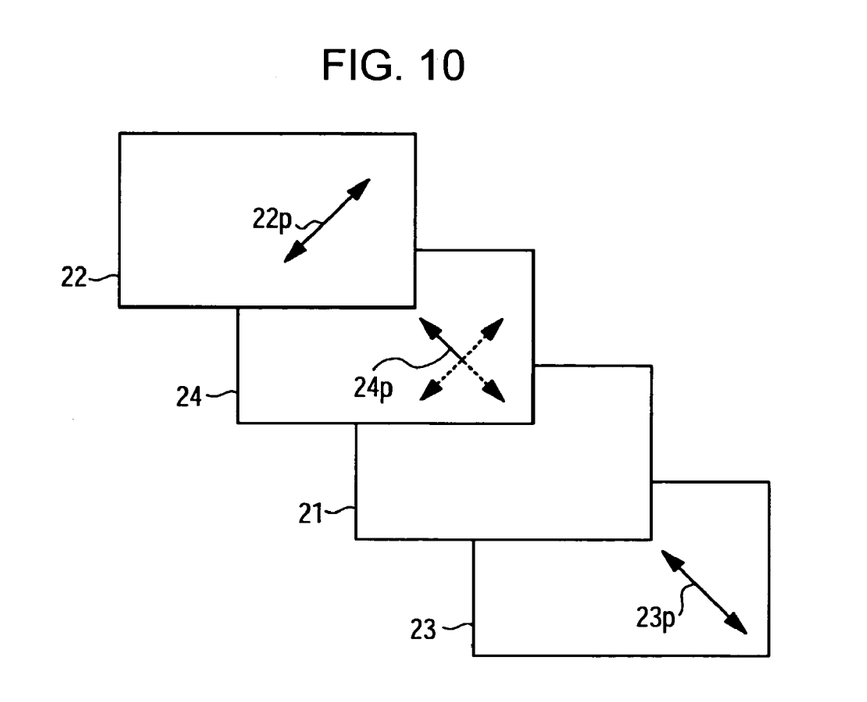
FIG. 10 is a view for explaining a relation between a polarization axis and a slow axis according to the second embodiment.

In the embodiment, as shown in FIG. 9, the polarization axis 22p (a polarized-light transmitting axis in the example shown in the figure) of the polarizing layer 22 and the polarization axis 24p of the viewing-angle controlling liquid crystal layer 24 in the horizontal alignment state are constructed to be parallel to each other, and the polarization axis 23p (a polarized-light transmitting axis in the example shown in the figure) of the polarizing layer 23 and the polarization axis 22p (a polarized-light transmitting axis) are constructed to be perpendicular to each other. In addition, although the slow axis 24p of the viewing-angle controlling liquid crystal layer 24 in the horizontal alignment state is perpendicular to the polarization axis 22p (a polarized-light transmitting axis) of the polarizing layer 22 as shown in FIG. 10, the slow axis may be constructed to be parallel to a polarized-light absorbing axis (not shown). In addition, as shown in FIG. 10, it is more preferable that the polarization axes 22p and 23p and the slow axis 24p are defined to be in a direction slanted from an up/down direction (a direction having a slop of 45°) when the display screen is seen from the front side thereof. In this case, it is preferable that the slanted angle of the slow axis is optically defined in a range of 10° to 45° with respect to a polarization axis.

In addition, in any case, the direction of the slow axis of the viewing-angle controlling liquid crystal layer 24 may be defined to be four directions including three perpendicular direction denoted by dotted lines in FIGS. 9 and 10. Namely, in the horizontal alignment state of the viewing-angle controlling liquid crystal layer 24, the liquid crystal molecules 21*m* can be inverted in the four directions by using alignment defining members similar to the displaying liquid crystal cell 210, a condition that the slow axis 24*p* is substantially parallel to one of the polarized-light transmitting and absorbing axes of the polarizing layer 22 is stratified, and a deflection of a distribution of an azimuth angle in optical characteristics of the viewing-angle controlling liquid crystal layer 24 can be reduced.

Figure 8:
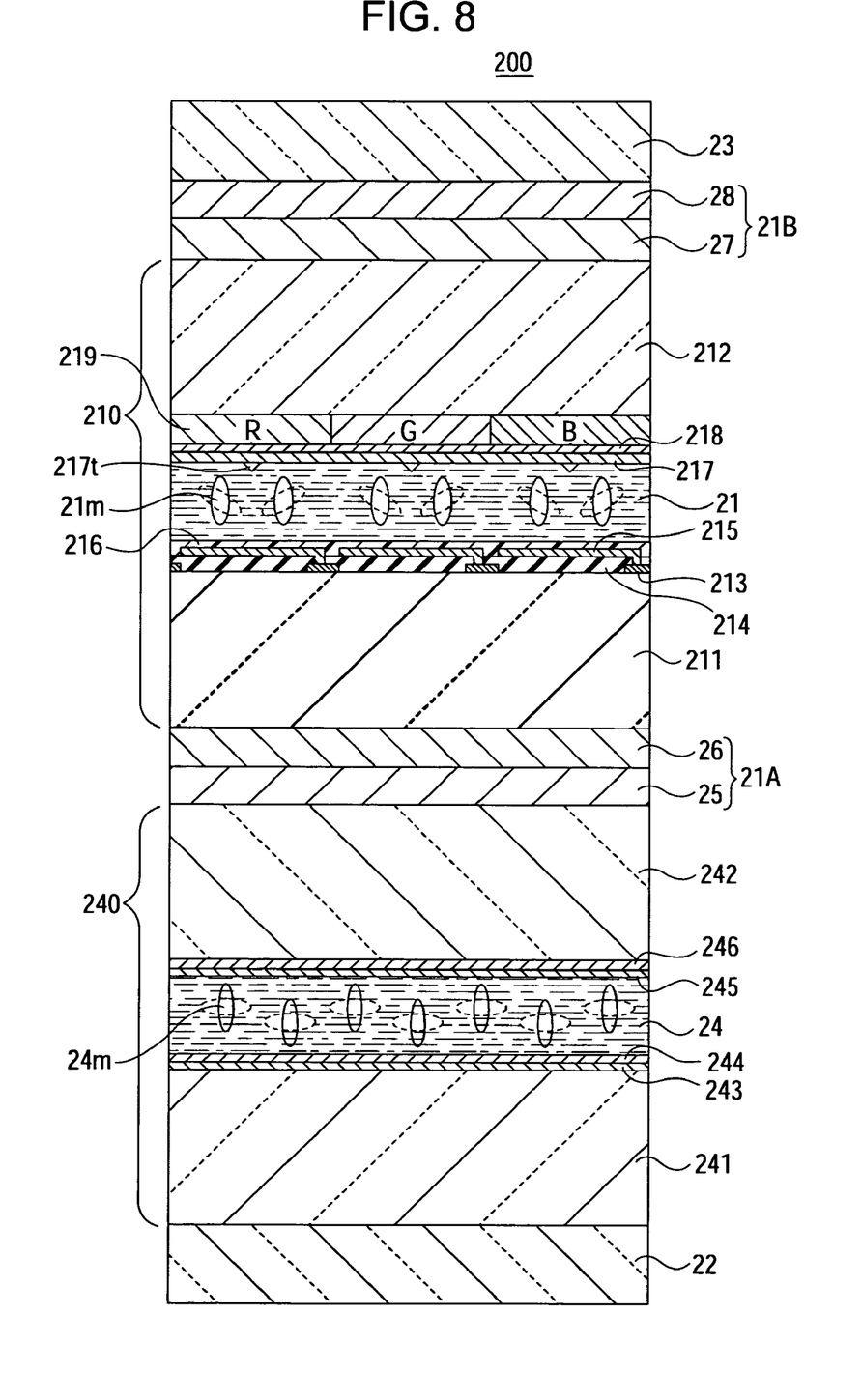
FIG. 8 is a partially enlarged longitudinal cross sectional view showing an enlarged cross sectional structure of a second embodiment.

In the embodiment, as shown in FIG. 8, the phase difference layer 21A is disposed between the viewing-angle controlling liquid crystal cell 240 and the displaying liquid crystal cell 210, and the phase difference layer 21B is disposed between the displaying liquid crystal cell 210 and the polarizing layer 23. For example, the phase difference layer 21A is constructed by stacking a ¼ wave layer 25 and a C plate 26, and the phase difference layer 21B is constructed by stacking a C plate 27 and a ¼ wave layer 28. Here, the phase difference layers 21A and 21B may be constructed with only the ¼ wave layers, respectively. The ¼ wave layers 25 and 28 have different values of refraction indexes nx and ny (in a notation that refraction indexes of perpendicular axes are denoted by nx, ny, and nz, and a refraction index of an optical axis is denoted by nz) and a predetermined retardation in the optical axis so as to change the phase difference of perpendicular components of a polarized light by ¼ wavelength. In the embodiment, in order that the ¼ wave layer 25 can convert the linearly polarized light to a circularly polarized light and the ¼ wave layer 28 can convert the circularly polarized light toe the linearly polarized light, the ¼ waver layers 25 and 28 are disposed in a predetermined relation with respect to the polarization axis (that is, a relation that the optical axis has an azimuth angle difference of 45°).

In addition, the C plates 26 and 27 are members for stratifying a relation of nx=ny>nz in the above defined refraction indexes and reducing defective display such as light leakage caused by a viewing angle characteristic of the vertical alignment state of the displaying liquid crystal layer 21 in the vertically aligned mode. In the embodiment, the phase difference (nz−nx)·d (here, d is a thickness in the optical direction) of the C plates 26 and 27 is 135 nm.

In the embodiment, by providing the phase difference layers 21A and 21B, since the relation between the alignment direction of the displaying liquid crystal layer 21 and the polarized-light transmitting and absorbing axes of the polarizing layers 22 and 23 are not need to be strictly defined, an effect in that production can be easily performed is obtained. In addition, in a case where a metal light-shielding film such as a Cr film is provided to an observer's side rather than the displaying liquid crystal layer 21 in the displaying liquid crystal cell 210, an effect in that light reflecting from a surface of the metal light-shielding film can be shield is obtained.

Figure 11:
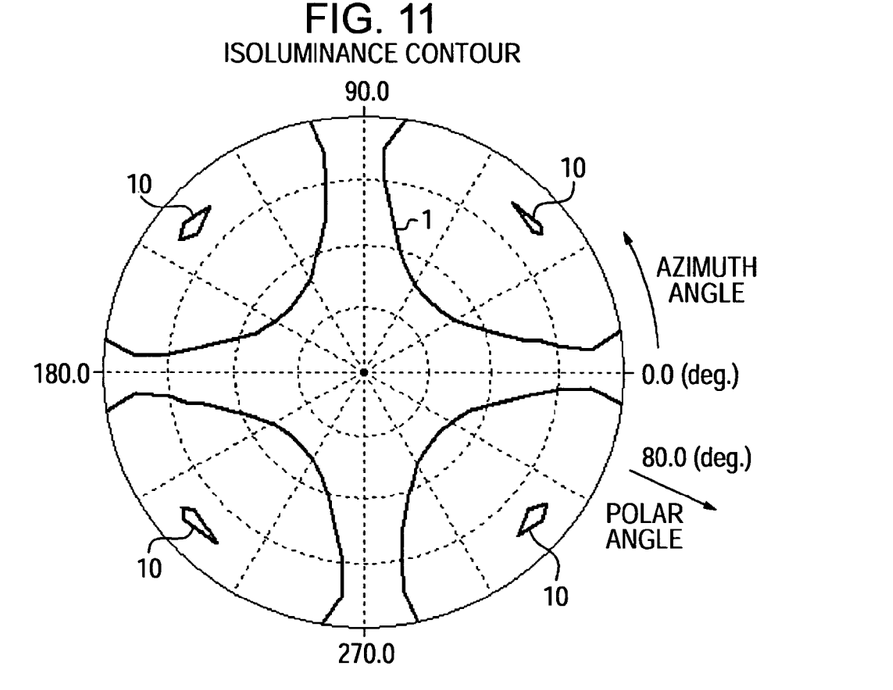
FIG. 11 is a distributional view showing distributions of azimuth and polar angles of brightness in a case where a viewing-angle controlling liquid crystal layer and a displaying liquid crystal layer are in a horizontal alignment state and a light-shielding state, respectively, in the second embodiment.
Figure 12:
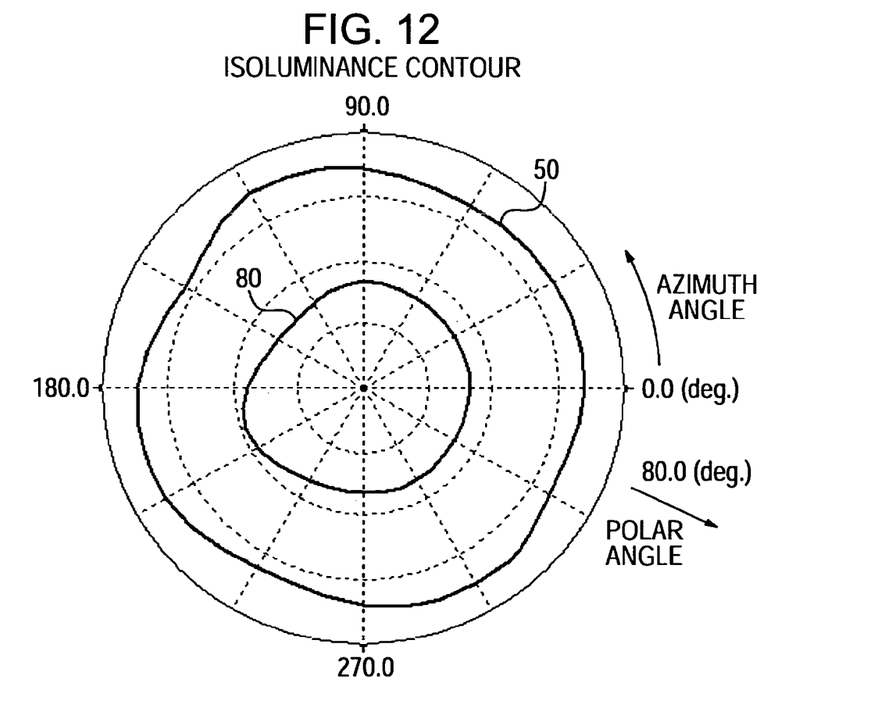
FIG. 12 is a distributional view showing distributions of azimuth and polar angles of brightness in a case where a viewing-angle controlling liquid crystal layer and a displaying liquid crystal layer are in a horizontal alignment state and a light-transmitting state, respectively, in the second embodiment.
Figure 13:
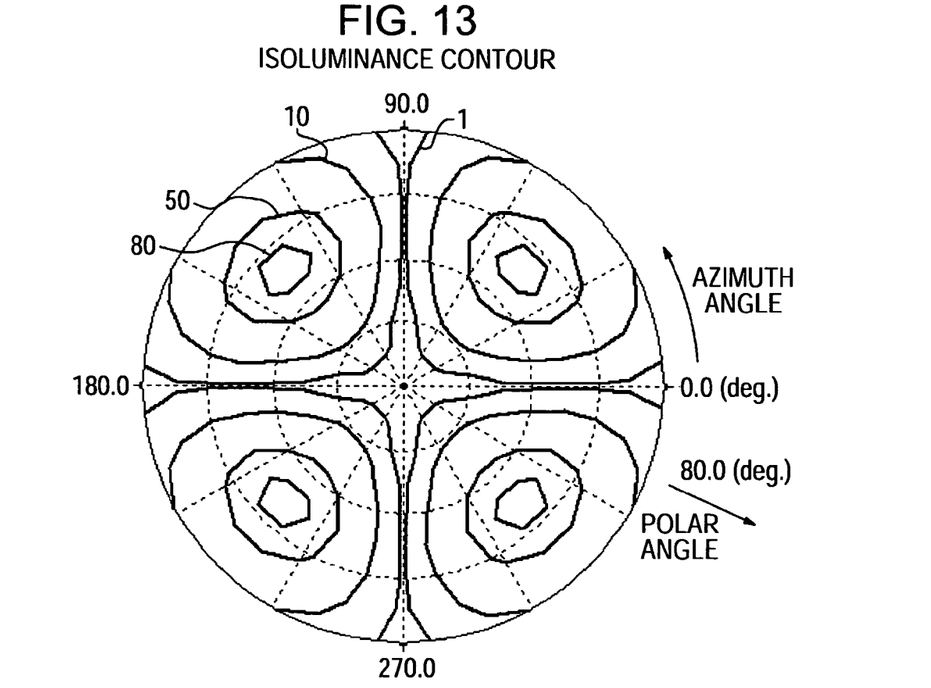
FIG. 13 is a distributional view showing distributions of azimuth and polar angles of brightness in a case where a viewing-angle controlling liquid crystal layer and a displaying liquid crystal layer are in a vertical alignment state and a light-shielding state, respectively, in the second embodiment.
Figure 14:
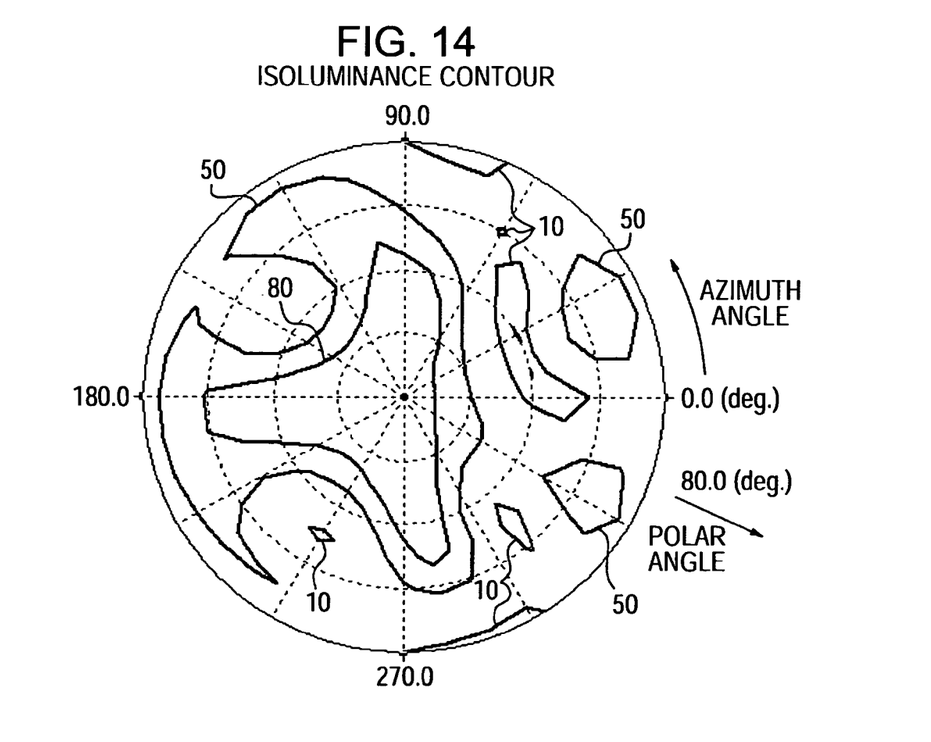
FIG. 14 is a distributional view showing distributions of azimuth and polar angles of brightness in a case where a viewing-angle controlling liquid crystal layer and a displaying liquid crystal layer are in a vertical alignment state and a light-transmitting state, respectively, in the second embodiment.

FIGS. 11 and 12 are views showing distributions of azimuth and polar angles of brightness characteristics in the light-shielding and light-transmitting states of the displaying liquid crystal cell 210 in a case where the viewing-angle controlling liquid crystal layer 24 is in a horizontal alignment state in the embodiment having the constructions shown with solid lines in FIG. 9, and FIGS. 13 and 14 are views showing distributions of azimuth and polar angles of brightness characteristics in the light-shielding and light-transmitting states of the displaying liquid crystal cell 210 in a case where the viewing-angle controlling liquid crystal layer 24 is in a vertical alignment state. Here, retardation Δn·d of the viewing-angle controlling liquid crystal layer 24 is defined to be 1.0 μm. In addition, in the figures, reference numerals 1, 10, 50, and 80 denote light transmittance of 1%, 10%, 50%, and 80% shown by isoluminance contours of the associated apparatuses.

Referring to the brightness distributions of the light-shielding and light-transmitting states shown in FIGS. 11 and 12, it can be understood that a high contrast can be obtained over a wide viewing angle range when the viewing-angle controlling liquid crystal layer 24 is in the horizontal alignment state. In particular, a high light-shielding state of 1% can be obtained over the entire range in the directions of the polarization axes of the polarizing layers 22 and 23. On the other hand, referring to the brightness distributions of the light-shielding and light-transmitting states shown in FIGS. 13 and 14, it can be understood that a region indicating a high light-shielding state of 1% is greatly limited when the viewing-angle controlling liquid crystal layer 24 is in the vertical alignment state, and a region indicating a high brightness in the light-transmitting state, so that the viewing angle is greatly limited. In particular, directions deviated from the directions of the polarization axes of the polarizing layers 22 and 23, the brightness of the light-shielding and light-transmitting state are inverted, and a positive negative display inversion occurs.

Figure 15:
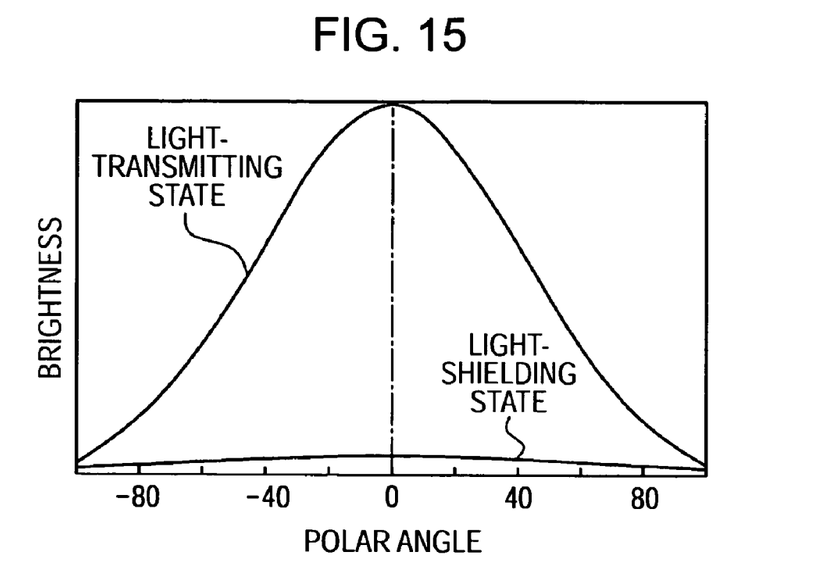
FIG. 15 is a graph showing a distribution of a polar angle of brightness in a scheme in case of limiting a viewing angle.
Figure 16:
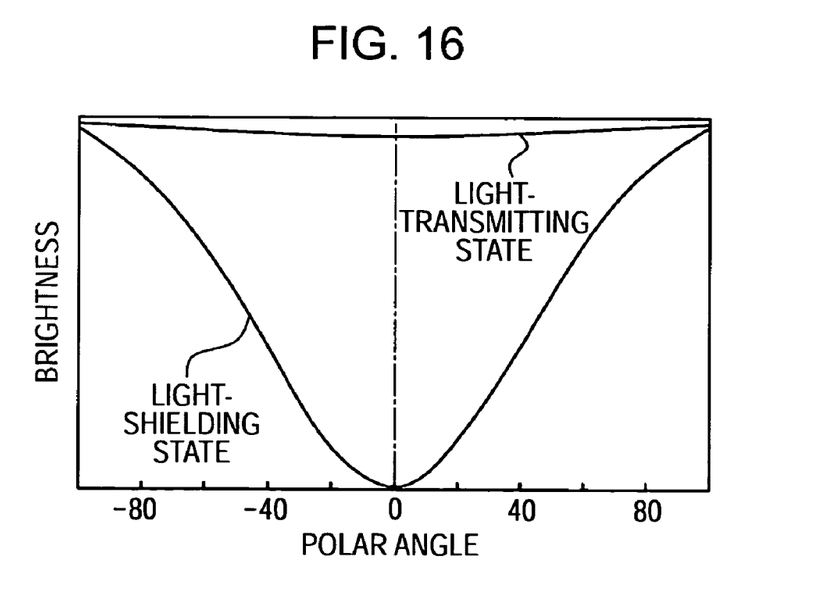
FIG. 16 is a graph showing a distribution of a polar angle of brightness in another scheme in case of limiting a viewing angle.

FIGS. 15 and 16 are graphs showing a principle for viewing angle limitation. The graph of FIG. 15 shows a scheme that the contrast decreases in a portion where the polar angle increases by substantially planarizing the distribution of the polar angle of the brightness of the light-shielding state and decreasing the brightness of the light-transmitting state in the portion where the polar angle increases. The scheme for limiting the viewing angle corresponds to the first embodiment. On the other hand, the graph of FIG. 16 shows another scheme that the contrast decreases in the portion of the polar angle increase by substantially planarizing the distribution of the polar angle of the brightness of the light-transmitting state and increasing the brightness of the light-shielding state (that is, generating light leakage) in the portion where the polar angle increases. Any one of the schemes shown in FIGS. 15 and 16 can be used to limit the viewing angle, and the latter scheme substantially corresponds to the second embodiment. In addition, FIGS. 15 and 16 schematically show a virtual distribution of brightness in order to explain for the two schemes, but the figures do not show an actual distribution of brightness.

Figure 17:
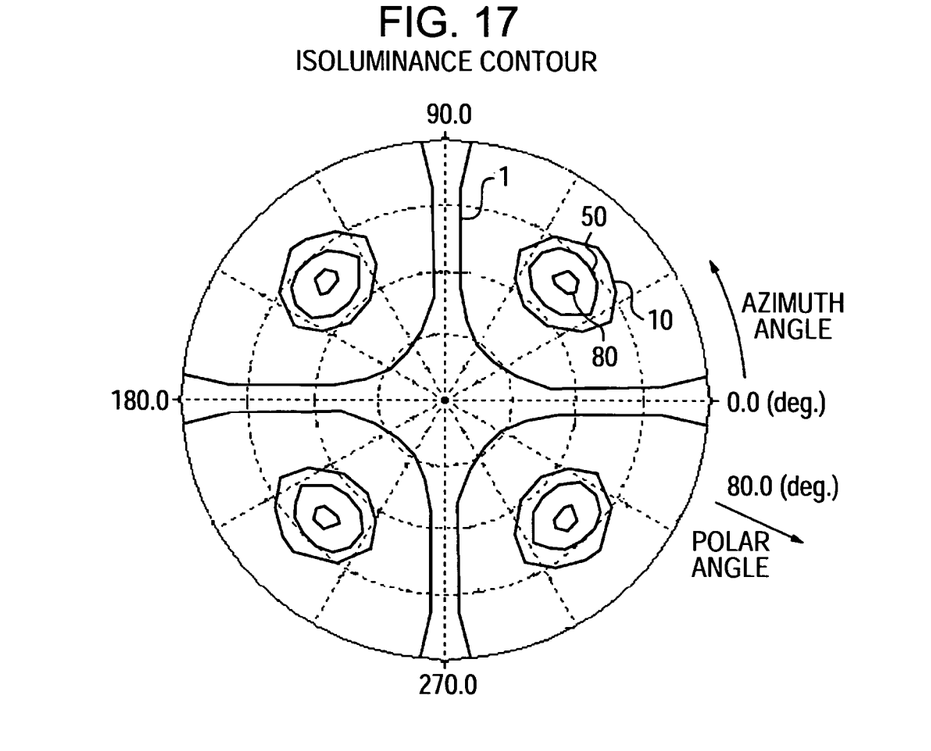
FIG. 17 is a distributional view showing distributions of azimuth and polar angles of brightness in a case where a viewing-angle controlling liquid crystal layer and a displaying liquid crystal layer are in a vertical alignment state and a light-shielding state, respectively, in a construction where retardation of the viewing-angle controlling liquid crystal layer in the second embodiment is changed.

FIG. 17 shows a distribution of brightness of the light-shielding state in a case where the viewing-angle controlling liquid crystal layer 24 is in a vertical alignment state in a construction where retardation Δn·d of the viewing-angle controlling liquid crystal layer 24 in the second embodiment 0.5 μm. In the distribution of brightness, it can be understood that a region indicating a high light-shielding state is slightly widened in comparison to the distribution shown in FIG. 13, but the brightness in a region where the polar angle is high sufficiently increases, so that a practical viewing angle limitation effect can be obtained. In general, if the retardation of the viewing-angle controlling liquid crystal layer 24 is 0.5 μm or more, the viewing angle limitation can be sufficiently performed.

In addition, in any one of the first and second embodiment, the one-side polar layer and viewing-angle controlling liquid crystal layer are optically adjacent thereto. By doing so, the polarization axis of the polarizing layer and the slow axis of the viewing-angle controlling liquid crystal layer are substantially optically coincident to each other, so that the aforementioned excellent effect can be obtained.

In addition, although a stacked structure of a pair of polarizing layers sandwich the displaying liquid crystal layer therebetween and another separate pair of polarizing layers sandwich the viewing-angle controlling liquid crystal layer therebetween may be considered to be a viewing angle controlling scheme, in the structure, display is darkened, and both of the schemes cannot be employed, so that only the scheme shown in FIG. 15 must be employed. On the other hand, since any one of the first and second embodiments can be implemented by using a pair of polarizing layers, display can be brightened, and the scheme shown in FIG. 16 in addition to the scheme shown in FIG. 15 can be employed.

Third Embodiment

Figure 18A:
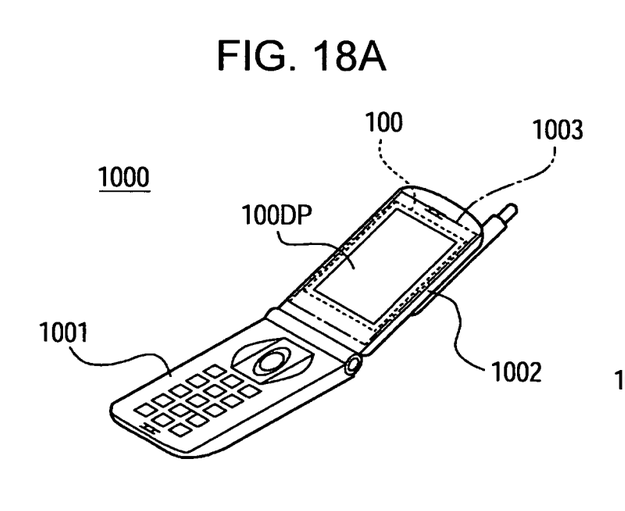
FIG. 18A shows a perspective view of an outer appearance of an electronic apparatus.
Figure 18B:
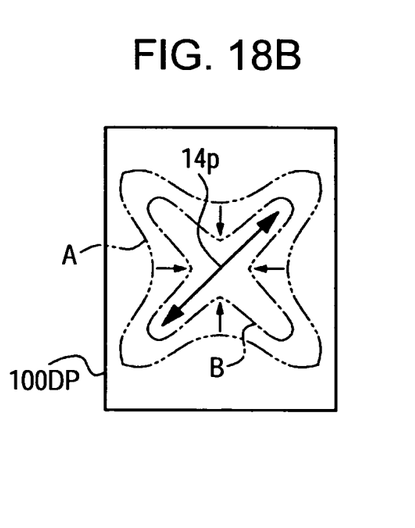
FIG. 18B shows a view of a display screen.

Finally, an electronic apparatus which the aforementioned liquid crystal display apparatus is built in will be described. FIG. 18A shows an outer appearance of a mobile phone as an example of an electronic apparatus 1000 (a portable electronic apparatus) according to the present invention, and FIG. 8B shows a display screen 100DP of the associated electronic apparatus 1000. As shown in FIG. 18A, an operation portion 1001 and a display portion 1002 are provided to the electronic apparatus 1000, and the operation portion 1001 and the display portion 1002 are allowed to be folded. A circuit board 1003 is received in the display portion 1002, the liquid crystal display apparatus 100 is mounted on the display portion 1002, and the display screen 100DP is exposed to a surface of the display portion 1002.

As shown in FIG. 18B, in the display screen 100DP of the liquid crystal display apparatus 100, the polarized-light transmitting axis 14p of the polarizing layer 12 adjacent to the viewing-angle controlling liquid crystal layer 14 and the polarized-light absorbing axis (not shown) perpendicular thereto are defined in slanted directions with respect to the up/down direction of the display screen 100DP. In addition, when the viewing-angle controlling liquid crystal layer 14 is in the horizontal alignment state, the distributions of the azimuth and polar angles of the contrast become a curve A, and when the viewing-angle controlling liquid crystal layer 14 changes into the vertical alignment state, the distribution of the contrast in a direction deviated from the polarized-light transmitting axis 14p and the polarized-light absorbing axis perpendicular thereto is limited in a narrow range, and the viewing angle is greatly reduced as indicated by a curve B. Therefore, although the display screen 100DP intends to be displayed in a slanted direction from the up/down and left/right directions of the display screen 100DP by changing the viewing-angle controlling liquid crystal layer 14 into the vertical alignment state, the display contents cannot be perceived due to the viewing angle limitation. In particular, in many cases where a person excluding an owner of the electronic apparatus 1000 intends to see the apparatus in a slanted direction from the left/right direction, the seeing from the left/right direction can be surely prevented by changing the viewing-angle controlling liquid crystal layer 14 into the vertical alignment state.

In addition, the liquid crystal display apparatus and the electronic apparatus according to the present invention are not limited the aforementioned examples, but various modifications can be made without departing from the scope of the present invention. For example, although the aforementioned embodiments are described by exemplifying an active matrix type liquid crystal display apparatus including switching device, the present invention may employ a passive matrix type liquid crystal display apparatus or a segmented type liquid crystal display apparatus.

The entire disclosure of Japanese Patent Application No. 2005-011177, filed Jan. 19, 2005, is expressly incorporated by reference herein.

What is claimed is:

1. A liquid crystal display apparatus comprising:
    a displaying liquid crystal layer;
    a displaying electric field applying structure that applies a displaying electric field to the displaying liquid crystal layer;
    a pair of polarizing layers that sandwich the displaying liquid crystal layer therebetween;
    a viewing-angle controlling liquid crystal layer disposed between one of the polarizing layers and the displaying liquid crystal layer, the viewing-angle controlling liquid crystal layer changing between substantial horizontal and vertical alignment states, the viewing-angle controlling liquid crystal layer when in the horizontal alignment state exhibiting a slow axis that is parallel to a polarized-light transmitting or absorbing axis of the polarizing layer that is disposed opposite to the displaying liquid crystal layer from the viewing-angle controlling liquid crystal layer; and
    a viewing-angle controlling electric field applying structure that applies a viewing-angle controlling electric field to the viewing-angle controlling liquid crystal layer.

2. The liquid crystal display apparatus according to claim 1, wherein the viewing-angle controlling liquid crystal layer is in a horizontal alignment state when no electric field is applied by the viewing-angle controlling electric field applying structure, and the viewing-angle controlling liquid crystal layer is in a vertical alignment state when an electric field is applied.

3. The liquid crystal display apparatus according to claim 1, wherein the viewing-angle controlling liquid crystal layer is in a vertical alignment state when no electric field is applied by the viewing-angle controlling electric field applying structure, and the viewing-angle controlling liquid crystal layer is in a horizontal alignment state when an electric field is applied.

4. The liquid crystal display apparatus according to claim 3, wherein an alignment azimuth angle in the horizontal alignment state of the viewing-angle controlling liquid crystal layer is defined as four directions which are substantially parallel to the polarized-light transmitting and absorbing axes.

5. The liquid crystal display apparatus according to claim 1, wherein phase difference layers are disposed to be adjacent to both sides of the displaying liquid crystal layer.

6. The liquid crystal display apparatus according to claim 1, wherein the slow axis of the viewing-angle controlling liquid crystal layer is defined to be slanted when a display screen is seen from a front surface thereof.

7. An electronic apparatus which the liquid crystal display apparatus according to any one of claim 1 is built in.

8. A liquid crystal display apparatus comprising:
    a displaying liquid crystal layer;
    a displaying electric field applying structure that applies a displaying electric field to the displaying liquid crystal layer;
    a pair of polarizing layers that sandwich the displaying liquid crystal layer therebetween;
    a viewing-angle controlling liquid crystal layer disposed between one of the polarizing layers and the displaying liquid crystal layer, the viewing-angle controlling liquid crystal layer changing between substantial horizontal and vertical alignment states, the viewing-angle controlling liquid crystal layer when in the horizontal alignment state exhibiting a slow axis that is parallel to a polarized-light transmitting or absorbing axis of the polarizing layer that is disposed opposite to the displaying liquid crystal layer from the viewing-angle controlling liquid crystal layer;

a viewing-angle controlling electric field applying structure that applies a viewing-angle controlling electric field to the viewing-angle controlling liquid crystal layer; and phase difference layers are disposed to be adjacent to both sides of the displaying liquid crystal layer.

9. The liquid crystal display apparatus according to claim 8, wherein the viewing-angle controlling liquid crystal layer is in a horizontal alignment state when no electric field is applied by the viewing-angle controlling electric field applying structure, and the viewing-angle controlling liquid crystal layer is in a vertical alignment state when an electric field is applied.

10. The liquid crystal display apparatus according to claim 8, wherein the viewing-angle controlling liquid crystal layer is in a vertical alignment state when no electric field is applied by the viewing-angle controlling electric field applying structure, and the viewing-angle controlling liquid crystal layer is in a horizontal alignment state when an electric field is applied.

11. The liquid crystal display apparatus according to claim 10, wherein an alignment azimuth angle in the horizontal alignment state of the viewing-angle controlling liquid crystal layer is defined as four directions which are substantially parallel to the polarized-light transmitting and absorbing axes.

12. The liquid crystal display apparatus according to claim 8, wherein the slow axis of the viewing-angle controlling liquid crystal layer is defined to be slanted when a display screen is seen from a front surface thereof.

13. An electronic apparatus including the liquid crystal display apparatus according to claim 8.

* * * * *